Patented Apr. 4, 1939

2,152,828

UNITED STATES PATENT OFFICE 2,152,828

RUBBERLIKE PRODUCTS AND PREPARATION THEREOF

Robert M. Thomas, Union, N. J., assignor to Standard Oil Development Company, a corporation of Delaware No Drawing. Application December 11, 1936, Serial No. 115,356

15 Claims. (Cl. 260—94)

This invention relates to novel rubberlike products and methods of preparing same. More particularly it relates to the preparation of sulfur chloride derivatives of high molecular weight polymers of iso-olefins such as isobutylene.

It has recently been discovered that plastic or elastic linear type hydrocarbon products (the chemical structure of which may be represented as being an extremely long chain of carbon atoms with a number of short side chains of alkyl groups and hydrogen atoms), the entire product being substantially saturated with respect to hydrogen, can be made by polymerization of iso-olefines, particularly isobutylene, in the presence of an active volatile halide catalyst such as boron fluoride, at low temperature, i. e. below —10° C. and preferably as low as —50° C. or even —80° C. or lower, using a solvent or diluent such as liquefied propane or ethylene, etc. Such polymers can be made having a molecular weight ranging from 1,000 or 3,000 up to an intermediate range of 10,000 or 25,000 or up to a very high range such as 200,000 or 300,000 or more.

Although these polymers are substantially saturated and are extremely resistant to oxidation and attack by common chemical reagents such as sulphuric acid, caustic soda, etc., it has now been discovered, greatly contrary to expectation, that these polymers can be sulfur chloride treated or vulcanized to a certain extent.

By this procedure the relatively low molecular weight polymer is vulcanized to a tough oil-resistant rubbery material of good stability lacking any tendency towards cold flow which characterizes the plastic solid isobutylene polymers before treatment. All of the polymers become non-sticky and attain a substantial tensile strength and elasticity by effecting the sulphur choride treatment according to the present invention which will be described more fully below.

The temperature to be used for the sulphurizing process may vary over a fairly wide range depending upon the type and concentration of materials being used and the desired speed of vulcanization. However, it should be generally carried out between the approximate limits of 20–200° C. with the preferred range being about 80–160° C.

According to the above statement as to the temperature it is also understood that the time of reaction will necessarily vary depending upon the temperature used. For instance, with temperatures in the lower range, the time required may be as long as 2 or 3 days or more whereas with the very high temperatures, such as 120–200° C., a reaction time of several hours or even a few minutes may be used. Generally it is preferred to use a temperature in the range of 80–160° C. and a reaction time between the approximate limits of 10 minutes and 50 hours. As explained later, the temperature and time are inter-related with the amount of sulphur monochloride used and to a certain extent also with the amount of solvent used.

The process is preferably carried out in the presence of a suitable solvent or diluent such as naphtha, carbon tetrachloride, carbon disulfide, etc., although this solvent is not absolutely necessary. Ordinarily the amount of solvent to be used will be about 0.5–10 parts by weight of solvent, to 1 part by weight of polymer. If no solvent is used the polymer may be dissolved or suspended or otherwise mixed directly in with the sulphur monochloride.

Although $S_2Cl_2$ is preferred, other sulphur halides may be used, for example the dichloride of sulphur. The amount of the sulphurizing agent, i. e. sulphur monochloride, may vary widely depending chiefly upon the temperature and duration of treatment, e. g. 1–50%, although ordinarily it is preferred to use 5%–30% or so by weight unless sulphur chloride itself is desired as the solvent for the reaction. The smaller amounts may be used with a reaction temperature in the upper range of the limits given above, in other words, say from 100–150° C. and with a reaction time of about 5 or 10 hours or more. The larger amounts of sulphur monochloride permit carrying out the reaction either at a lower temperature or in a shorter time.

Other addition agents may be used if desired, for instance, fillers such as carbon black and the like and inorganic accelerators such as litharge, zinc oxide, and the like or organic accelerators such as organic amines, e. g. hexamethylene tetramine, diphenyl guanidine, triphenyl guanidine or other known rubber vulcanization accelerators.

After the completion of the sulphur chloride treatment the solvent (if any was used) may be separated from the product by precipitation of the latter with a non solvent such as alcohol, acetone, etc. The precipitated product may be further freed of solvent, etc., by milling or by drying and pressing at elevated temperatures, or by drying under reduced pressures. If desired the product after being precipitated out with alcohol may be purified by redissolving in benezene, adding filter aid and then filtering through finely powdered sodium hydroxide. Alcohol is added to the filtrate to precipitate out the sulphur chloride treated product which is then pressed in a heated press under a suitable pressure such as about 2,000 lbs./sq. in. If the press is kept at about 110° C. the product shows a lack of tendency toward cold flow but if it is heated to 160° C. the product tends to soften slightly and then has a slight tendency toward cold flow to about the same extent as an untreated isobutylene polymer of about 100,000 molecular weight heated to about 110° C.

The products made according to the above process have greater elasticity and elongation as well as less stickiness and less tendency toward cold flow than the original hydrocarbon polymer before the sulphur chloride treatment. The products are also very resistant to various chemical agents such as acids, alkalies, oxidizing agents, etc.

Due to their novel and useful properties these products find particular adaptation in many fields, for example as valuable addition agents to or substitutes for rubber for the preparation of rubber goods, and tires. These products, particularly those which have been prepared by relatively light sulphur chloride treating conditions, are also adapted for use in making extreme pressure lubricants.

The high molecular weight polymers of isobutylene described above have been found particularly suitable for the invention and are preferred. However, the invention may also be applied to other materials which are believed to have a generally similar chemical structure, for instance, linear polymers of other iso-olefines having about the same degree of polymerization.

Although the fundamental features of the invention have been described in detail, the invention will be even better understood from the following examples which are given for the sake of illustration and without intention of limiting the invention thereto:

Example 1

20 gm. of 13,000 molecular weight isobutylene polymer was mixed with an equal part by weight of $S_2Cl_2$ and slightly warmed. A clear solution was obtained which became cloudy on cooling again to room temperatures. The mixture was allowed to stand 20 hours, and then the product recovered by repeated precipitations of the material from benzene solution with methyl alcohol. Colloidal sulphur (from the residual $S_2Cl_2$) thrown out was removed by filtering thru "filter aid". The recovered product was heated to drive off residual solvent and was found not to have undergone any substantial improvement in properties.

Example 2

The above experiment was conducted in a stoppered glass pressure bottle for a period of approximately 24 hours at 100° C. (immersed in steam bath). Product recovered as above was found to be vulcanized.

Example 3

20 gm. of 13,000 molecular weight isobutylene polymer in tetrachlor ethane solution was treated under a reflux condenser with approximately 30% by weight of $S_2Cl_2$ (based polymer) and allowed to react for approximately 48 hours at 100–130° C. temperature range. A sample recovered (as above) after 2 hours was not vulcanized. However, the next sample taken after 20 hours and the final product (after 48 hours total) were found vulcanized.

The product showed the following analysis:

| | |
|---|---|
| Carbon | 82.46 |
| Hydrogen | 13.26 |
| Chlorine | 1.60 |
| Sulphur | 1.31 |
| Unaccounted for | 1.37 |
| | 100.00 |

Example 4

10 grams of 15,000 molecular weight polymer of isobutylene was dissolved in 30 grams of ortho-dichlorobenzene and reacted with 10 grams (an excess) of sulphur monochloride at 160° C. After 20 minutes a good product was obtained which was strong, tough and elastic. Upon continuing the heating to a total of 30 minutes the product showed indications of having been slightly overtreated.

It is not intended that this invention be limited to any of the specific examples given or to any theory as to the mechanism of the operation or the invention but only by the appended claims in which it is intended to claim all novelty inherent in the invention as broadly as the prior art permits.

I claim:

1. The process of preparing rubberlike products which comprises treating a plastic or elastic substantially saturated aliphatic type iso olefine hydrocarbon polymer having a molecular weight below 40,000, with at least about 1% by weight of an agent comprising a sulphur halide.

2. Process according to claim 1 carried out at a temperature between the approximate limits of 75 and 200° C.

3. Process according to claim 1 carried out in the presence of a solvent.

4. Process according to claim 1 in which an isobutylene polymer having a molecular weight between 1,000 and 40,000 is used.

5. The process of preparing rubberlike products which comprises treating a plastic or elastic substantially saturated aliphatic type iso olefine hydrocarbon polymer having a molecular weight below 40,000 with sulphur monochloride at a temperature above about 75° C. for a time between the approximate limits of 10 minutes and 50 hours.

6. The method of producing rubberlike products which comprises treating polymerized isobutylene having a molecular weight about between 1,000 and 40,000 with at least about 5% by weight of sulphur monochloride at a temperature above about 75° C. for a time substantially longer than 5 hours.

7. Process according to claim 6 carried out at a temperature not substantially lower than 100° C. and for a period of about 50 hours.

8. Process according to claim 6 carried out in the presence of a solvent for the polymerized isobutylene.

9. A synthetic rubberlike product derived by sulphur chloride treatment of sticky plastic substantially saturated aliphatic type iso olefine hydrocarbon polymer of 1,000 to 40,000 molecular weight, said product being non-sticky and having a substantially greater elasticity and tensile strength and lesser cold flow than the polymer from which it was derived.

10. A tough non-sticky synthetic rubberlike product derived by the process described in claim 6.

11. The process which comprises treating a substantially saturated aliphatic iso olefine type hydrocarbon polymer at a temperature substantially above 100° C. with a substantial amount of an agent comprising a sulphur halide.

12. The process which comprises treating a substantially saturated aliphatic iso olefine type hydrocarbon polymer having a molecular weight above about 1000 at an elevated temperature of at least 120° C. with an agent comprising a sulphur halide.

13. The process which comprises heating a substantially saturated aliphatic iso olefine type hydrocarbon polymer having a molecular weight above about 1000 with an amount of an agent comprising a sulphur halide equal to at least 10% of the weight of the hydrocarbon material.

14. The process which comprises treating polymerized isobutylene having a molecular weight above 1000 with sulfur monochloride at an elevated temperature of at least 120° C. for a reaction time sufficient to cause a substantial toughening of the polymer.

15. The process which comprises treating polymerized isobutylene having an average molecular weight between about 1000 and 40,000 with at least 10% by weight of sulfur monochloride at an elevated temperature of at least 100° C. for a sufficient time to cause a substantial reaction between the sulfur monochloride and the polymerized isobutylene.

ROBERT M. THOMAS.